US012749422B2

(12) United States Patent
Lim et al.

(10) Patent No.: US 12,749,422 B2
(45) Date of Patent: Sep. 29, 2026

(54) DISPLAY DEVICE

(71) Applicant: Samsung Display Co., LTD., Yongin-si (KR)

(72) Inventors: Nam Jae Lim, Yongin-si (KR); Chang Hun Kim, Yongin-si (KR); Sung Jae Park, Yongin-si (KR); Young Woon Choi, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 19/015,427

(22) Filed: Jan. 9, 2025

(65) Prior Publication Data

US 2025/0384805 A1 Dec. 18, 2025

(30) Foreign Application Priority Data

Jun. 13, 2024 (KR) ........................ 10-2024-0076874

(51) Int. Cl.
*G09G 3/20* (2006.01)

(52) U.S. Cl.
CPC ......... *G09G 3/2007* (2013.01); *G09G 3/2092* (2013.01); *G09G 2310/061* (2013.01); *G09G 2310/08* (2013.01); *G09G 2320/0257* (2013.01); *G09G 2320/041* (2013.01); *G09G 2320/043* (2013.01); *G09G 2360/16* (2013.01)

(58) Field of Classification Search
CPC ............... G09G 3/2007; G09G 3/2092; G09G 2310/061; G09G 2310/08; G09G 2320/0257; G09G 2320/041; G09G 2320/043; G09G 2360/16; G09G 3/3208; G09G 2310/0278; G09G 2320/0271; G09G 2320/0285
See application file for complete search history.

(56) References Cited

U.S. PATENT DOCUMENTS

| | | | | |
|---|---|---|---|---|
| 9,721,512 | B2 | 8/2017 | Soni et al. | |
| 10,163,388 | B2 * | 12/2018 | Zhang | G09G 3/2003 |
| 10,262,582 | B2 * | 4/2019 | Han | G09G 3/3208 |

(Continued)

FOREIGN PATENT DOCUMENTS

KR 102425795 B1 7/2022

*Primary Examiner* — Jose R Soto Lopez
(74) *Attorney, Agent, or Firm* — Womble Bond Dickinson (US) LLP

(57) ABSTRACT

A display device includes: a display panel having a plurality of pixels in a display area; a scan driver driving gate lines of the display area; a data driver driving data lines in the display area; a timing controller sorting input image data to match a resolution of the display area and controlling driving timing of the scan driver and the data driver; and a deterioration compensator analyzing a deterioration index through the sorted image data, and generating deterioration-compensated image data based on the deterioration index data containing the deterioration index and an input gray-scale level of the sorted image data, to provide it to the data driver, wherein the deterioration compensator compensates and modulates the deterioration indices of the deterioration index data depending on a driving frequency of the display panel, and generates the deterioration-compensated image data using the deterioration index data containing the compensated and modulated deterioration index.

17 Claims, 17 Drawing Sheets

(56) References Cited

U.S. PATENT DOCUMENTS

| | | | | |
|---|---|---|---|---|
| 11,610,548 | B2 | 3/2023 | Xu et al. | |
| 12,272,331 | B2 * | 4/2025 | Cho | G09G 3/3648 |
| 2015/0049127 | A1 * | 2/2015 | Masumoto | H10K 71/40 445/6 |
| 2021/0013298 | A1 * | 1/2021 | Her | H10K 59/353 |
| 2022/0044619 | A1 * | 2/2022 | Sohn | G09G 3/20 |
| 2022/0223092 | A1 * | 7/2022 | Lee | G09G 3/2007 |
| 2023/0186827 | A1 * | 6/2023 | Jo | G09G 3/2096 345/60 |

* cited by examiner

FIG. 12

LUT

AGE →

GRAY ↓

| 8bit | 13bit | 0 | 1 | 2 | 3 | 4 | 5 | ··· | 1021 | 1022 | 1023 |
|---|---|---|---|---|---|---|---|---|---|---|---|
| 0 | 0 | 0 | 0 | 0 | 0 | 0 | 0 | ··· | 0 | 0 | 0 |
| 1 | 32 | 32 | 34 | 36 | 38 | 40 | 41 | ··· | 64 | 64 | 65 |
| 2 | 64 | 64 | 66 | 68 | 70 | 72 | 73 | ··· | 94 | 94 | 95 |
| ··· | ··· | ··· | ··· | ··· | ··· | ··· | ··· | ··· | ··· | ··· | ··· |
| ··· | ··· | ··· | ··· | ··· | ··· | ··· | ··· | ··· | ··· | ··· | ··· |
| 254 | 8128 | 8128 | 8172 | 8189 | 8192 | 8192 | 8192 | ··· | 8192 | 8192 | 8192 |
| 255 | 8160 | 8160 | 8181 | 8192 | 8192 | 8192 | 8192 | ··· | 8192 | 8192 | 8192 |
| 256 | 8192 | 8192 | 8192 | 8192 | 8192 | 8192 | 8192 | ··· | 8192 | 8192 | 8192 |
| | | | | | | | | | | | |
| ASR | | 1.000 | 0.995 | 0.992 | 0.998 | 0.984 | 0.982 | | 0.723 | 0.715 | 0.709 |

FIG. 15 k (columns), j (rows)

| | | | | | |
|---|---|---|---|---|---|
| 1.02 | 1.01 | ··· | ··· | 1.00 | 1.00 |
| 1.02 | 1.00 | ··· | ··· | 0.99 | 0.98 |
| ··· | ··· | ··· | ··· | ··· | ··· |
| 1.04 | 1.03 | ··· | ··· | 0.99 | 0.98 |
| 1.05 | 1.04 | ··· | ··· | 0.99 | 0.98 |

DISPLAY DEVICE

CROSS-REFERENCE TO RELATED APPLICATION

The present application claims priority to and the benefit of Korean Patent Application No. 10-2024-0076874, filed on Jun. 13, 2024, in the Korean Intellectual Property Office, the entire disclosure of which is incorporated herein by reference.

BACKGROUND

1. Field

Aspects of some embodiments of the present disclosure relate to a display device.

2. Description of the Related Art

As the information-oriented society evolves, consumer demand for display devices is ever increasing. For example, display devices are being employed by a variety of electronic devices such as smart phones, digital cameras, laptop computers, navigation devices, and smart televisions.

Display devices may be flat panel display devices such as liquid-crystal display devices, field emission display devices, and organic light-emitting display devices. Among such flat panel display devices, organic light-emitting display devices include a light-emitting element that can emit light on its own, so that each of the pixels of the display panel can emit light by themselves. Accordingly, a light-emitting display device can display images without a backlight unit that supplies light to the display panel.

The above information disclosed in this Background section is only for enhancement of understanding of the background and therefore the information discussed in this Background section does not necessarily constitute prior art.

SUMMARY

Aspects of the present disclosure provide a display device that calculates a grayscale compensation value based on the accumulated deterioration index and the grayscale value of the input image data, and displays images by compensating the input image data.

Aspects of the present disclosure also provide a display device that can calculate the optimal grayscale compensation value by correcting the deterioration index and calculating the grayscale compensation value depending on the driving frequency for each display device and the image display period or image blank period for each frame.

It should be noted that objects of the present disclosure are not limited to the above-mentioned object; and other objects of the present disclosure will be apparent to those skilled in the art from the following descriptions.

According to some embodiments of the present disclosure, a display device comprising a display panel having a plurality of pixels arranged in a display area to display an image, a scan driver configured to drive gate lines of the display area, a data driver configured to drive data lines in the display area, a timing controller configured to sort input image data to match a resolution of the display area and control driving timing of the scan driver and the data driver, and a deterioration compensator configured to analyze a deterioration index through the sorted image data, and generate deterioration-compensated image data based on the deterioration index data containing the deterioration index and an input grayscale level of the sorted image data, to provide it to the data driver, wherein the deterioration compensator compensates and modulates the deterioration indices of the deterioration index data depending on a driving frequency of the display panel, and generates the deterioration-compensated image data using the deterioration index data containing the compensated and modulated deterioration index.

According to some embodiments of the present disclosure, a display device comprising a display panel having a plurality of pixels arranged in a display area to display an image, a scan driver configured to drive gate lines of the display area, a data driver configured to drive data lines in the display area, a timing controller configured to sort input image data to match a resolution of the display area and control driving timing of the scan driver and the data driver, and a deterioration compensator configured to analyze a deterioration index through the sorted image data, and generate deterioration-compensated image data based on the deterioration index data containing the deterioration index and an input grayscale level of the sorted image data, to provide it to the data driver, wherein the deterioration compensator calculates deterioration weights and deterioration indices according to the deterioration weights based on the sorted image data, modulates the deterioration indices depending on a driving frequency of the display panel, and generates the deterioration-compensated image data using the deterioration index data containing the compensated and modulated deterioration index.

According to the embodiments of the present disclosure, by accurately calculating the deterioration index and calculating the grayscale compensation value based on the grayscale value of the input image data, it may be possible to relatively increase deterioration compensation efficiency, for example, by way of allowing all of the grayscale levels to be individually compensated in a display device.

In addition, by correcting the deterioration index depending on the driving frequency of each display device and on the image display period or the image blank period for each frame, etc., to calculate the grayscale compensation value, it may be possible to calculate optimal grayscale value, so that deterioration compensation can be performed depending on the driving characteristics of different display devices.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and characteristics of embodiments according to the present disclosure will become more apparent by describing in more detail aspects of some embodiments thereof with reference to the attached drawings, in which:

FIG. 12 is a block diagram for illustrating an example of the compensation data stored in the data storage of FIG. 10.

FIG. 15 is a diagram for illustrating an example of additionally applying position weights to deterioration data in the data compensator of FIG. 4.

DETAILED DESCRIPTION

Aspects of some embodiments of the present disclosure will now be described more fully hereinafter with reference to the accompanying drawings, in which aspects of some embodiments of the present disclosure are shown. This disclosure may, however, be embodied in different forms and should not be construed as limited to the embodiments set forth herein. Rather, these embodiments are provided so that this disclosure will be thorough and complete, and will filly convey the scope of the disclosure to those skilled in the art.

It will also be understood that when a layer is referred to as being “on” another layer or substrate, it can be directly on the other layer or substrate, or intervening layers may also be present. The same reference numbers indicate the same components throughout the specification.

It will be understood that, although the terms “first,” “second,” etc. may be used herein to describe various elements, these elements should not be limited by these terms. These terms are only used to distinguish one element from another element. For instance, a first element discussed below could be termed a second element without departing from the spirit and scope of embodiments according to the present disclosure. Similarly, the second element could also be termed the first element.

Each of the features of the various embodiments of the present disclosure may be combined or combined with each other, in part or in whole, and technically various interlocking and driving may be possible. Each embodiment may be implemented independently of each other or may be implemented together in an association.

Hereinafter, embodiments of the present disclosure will be described in more detail with reference to the accompanying drawings.

Some systems may compensate for the deterioration of pixels in display devices in order to prevent or reduce image sticking due to pixel deterioration and stress. Accordingly, some embodiments may compensate for image data by monitoring the amount of current flowing through the pixels and the emission time and temperature of the pixels. Such systems for compensating image data applies the same amount of compensation to all of the grayscale levels regardless of the grayscale levels of the display images. Practically, afterimage may be visible at some grayscale levels in the display panel according to such schemes.

Figure 1:
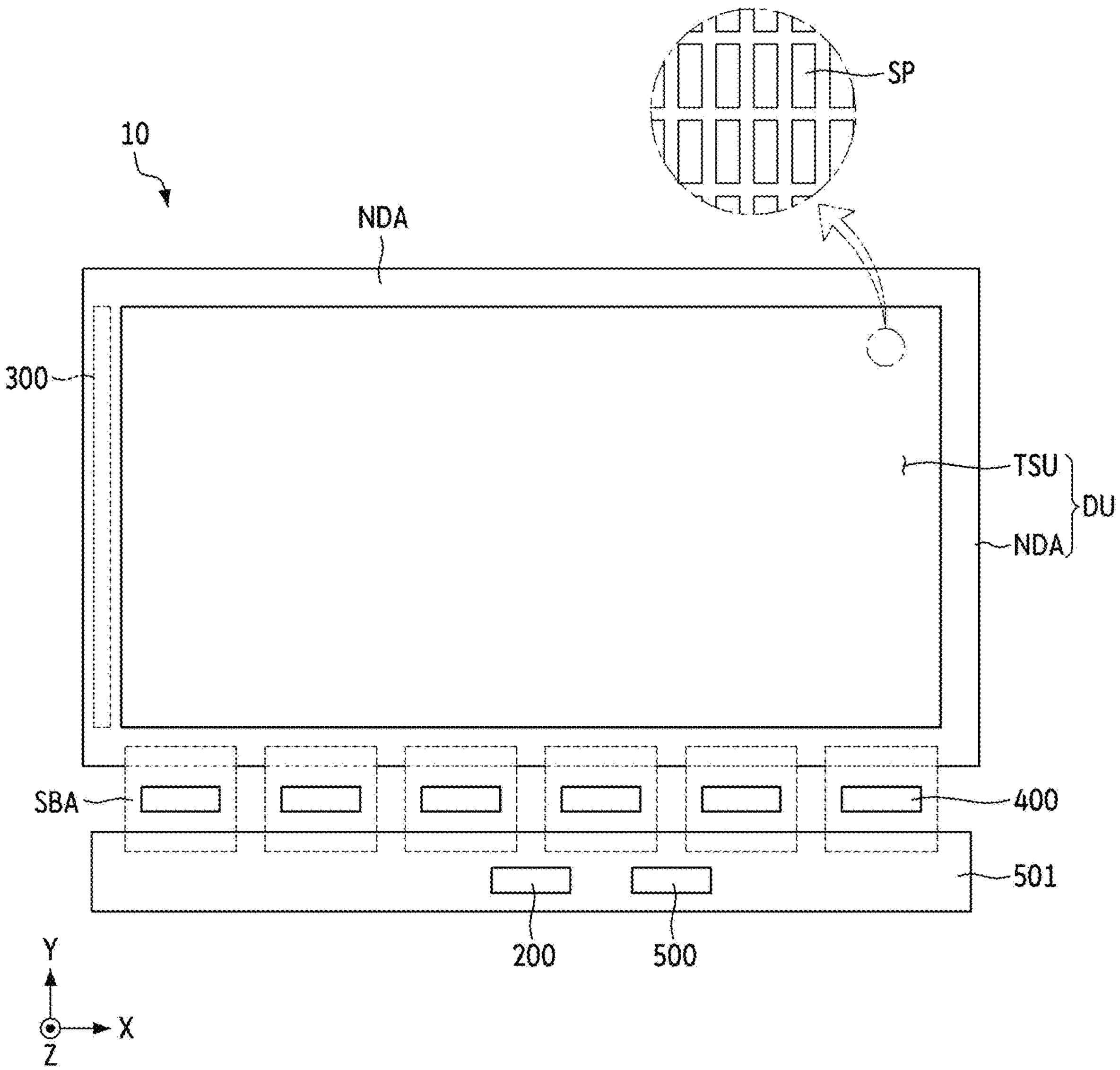
FIG. 1 is a plan view showing the configuration of a display device according to some embodiments of the present disclosure.
Figure 2:
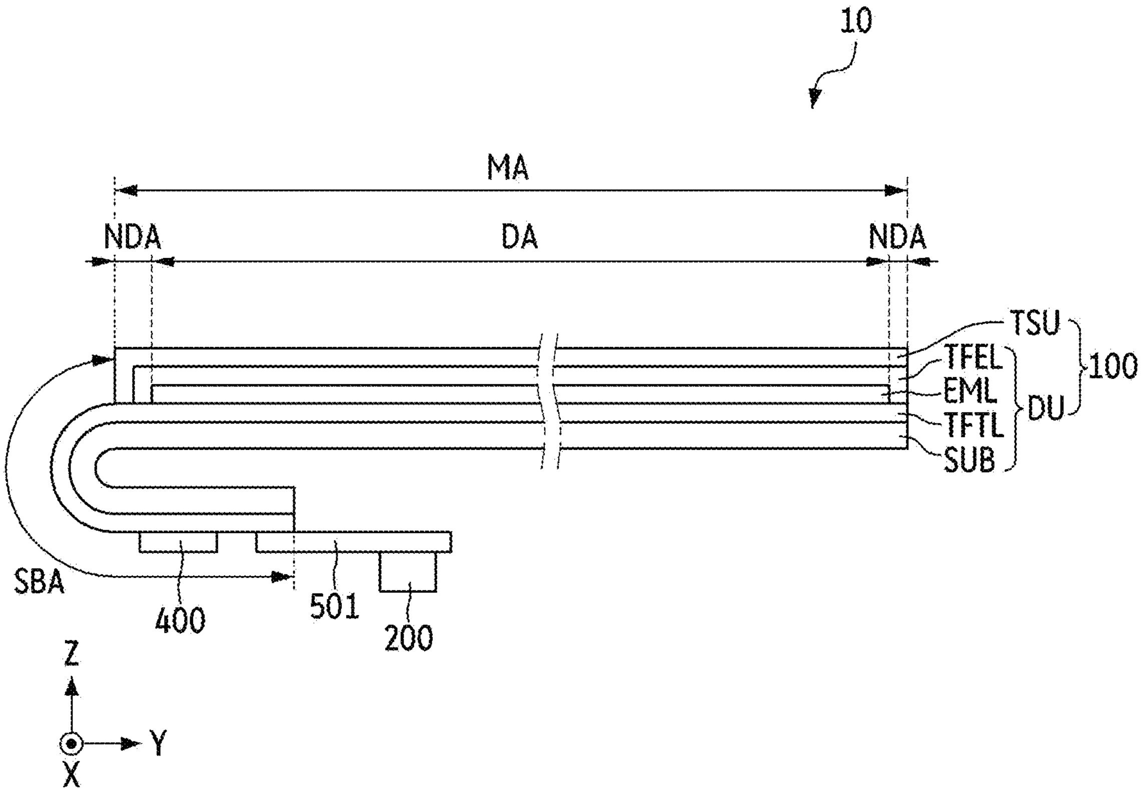
FIG. 2 is a cross-sectional view showing a side of the display device of FIG. 1 in detail.

FIG. 1 is a plan view showing the configuration of a display device according to some embodiments of the present disclosure. FIG. 2 is a cross-sectional view showing a side of the display device of FIG. 1 in more detail.

Referring to FIGS. 1 and 2, a display device 10 according to some embodiments of the present disclosure may be employed by or incorporated into an electronic device such as a portable electronic device such as a tablet PC, a portable multimedia player (PMP), a navigation device, an ultra mobile PC (UMPC), an electronic notebook, an electronic book, a mobile phone, a smart phone, a mobile communications terminal. For example, the display device 10 may be used as a display unit of an electronic device such as a television, a laptop computer, a monitor, an electronic billboard, or an Internet of Things (IOT) device.

In the following description, an organic light-emitting display device will be described as an example of the display device 10 according to some embodiments of the present disclosure. The organic light-emitting display device will be simply referred to as the display device 10 unless it is necessary to distinguish between them. It is, however, to be understood that the embodiments of the present disclosure are not limited to the organic light-emitting display device, and one of the above-listed display devices or any other display device well known in the art may be employed as the display device 10 without departing from the scope of the present disclosure.

According to some embodiments of the present disclosure, the display device 10 may have a rectangular shape, a square shape, a circular shape, an elliptical shape or a quadrangular shape when viewed from the top (e.g., in a plan view). For example, when the display device 10 is a mobile device such as a tablet PC, it may have a rectangular shape in which the longer sides are located in the horizontal direction. It should be understood, however, that embodiments according to the present disclosure are not limited thereto. The longer sides may be positioned in the vertical direction. Alternatively, the display device 10 may be installed rotatably so that the longer sides are positioned in the horizontal or vertical direction variably.

The display device 10 includes a display panel 100, a touch sensing unit (or touch sensor) TSU, a scan driver 300, a data driver 400, a timing controller 500, a compensation supporter (or compensation supporting unit or compensation supporting circuit or compensation supporting component) 101, and a deterioration compensator (or deterioration compensation unit or deterioration compensation circuit or deterioration compensation component) 200.

The display panel 100 of the display device 10 may include a display unit DU displaying images, and a touch sensing unit TSU is located on the display panel 100 to sense a part of a human body and an electronic pen. The display unit DU of the display panel 100 may include a plurality of pixels SP each representing red, green or blue, and may display images through the plurality of pixels SP. The display unit DU may include a plurality of pixels SP each representing red, green, blue or white. Three pixels SP displaying red, green and blue lights, respectively, may be sorted into a single unit pixel. Alternatively, four pixels SP displaying red, green, blue and white, respectively, may be sorted into a single unit pixel.

The touch sensing unit TSU may be mounted on the front surface of the display panel 100 or formed integrally with the display panel 100. The touch sensing unit TSU may include a plurality of touch electrodes to sense a user's touch by capacitive sensing using the touch electrodes or the like.

The scan driver 300 provides gate scan signals to the pixels SP for each horizontal line through the respective gate lines GL based on a gate control signal GCS from the timing controller 500. The scan driver 300 sequentially provides the gate scan signals to the gate lines for the respective horizontal lines and drives the pixels SP arranged for each horizontal line to sequentially charge data voltage. In addition, the scan driver 300 provides emission drive signals to the emission control lines for the respective horizontal lines of the display unit DU based on the gate control signal. The scan driver 300 sequentially provides the emission drive signals to the emission control lines and controls the pixel driving voltage of the pixels SP for each horizontal line to be output to the light-emitting elements.

The data driver 400 may include a plurality of data driver integrated circuits. The data driver 400 outputs data voltages according to the compensated image data to the pixels SP of the display unit DU based on a data drive control signal from the timing controller 500. The data driver integrated circuits may provide data voltages to the data lines DL connected to the pixels SP for each horizontal line every horizontal cycle.

The timing controller 500 may operate as a main processor or may be formed integrally with the main processor. Accordingly, the timing controller 500 may control the overall functions of the display device 10. For example, the timing controller 500 may sort image data input from a graphics card or an external graphics system according to the resolution of the display panel 100 and provides it to the deterioration compensator 200. Them, the timing controller 500 controls the data voltage output timing by the data driver 400 and the gate scan signal output timing by the scan driver 300. In doing so, the timing controller 500 generates data control signals to control the data voltage output timing by the data driver integrated circuits included in the data driver 400.

Incidentally, the timing controller 500 may detect touch coordinate information included in touch data of the touch sensing unit TSU and then generate digital video data according to the touch coordinate information. In addition, the timing controller 500 may run an application indicated by an icon displayed on the user's touch coordinates. For another example, the timing controller 500 may receive coordinate data from an electronic pen to determine the touch coordinates of the electronic pen, and then may generate digital video data according to the touch coordinates or may run an application indicated by an icon displayed at the touch coordinates of the electronic pen.

Referring to FIG. 2, the display panel 100 may be divided into a main area MA and a subsidiary area SBA. The main area MA may include a display area DA where the pixels SP for displaying images are located, and a non-display area NDA located around (e.g., in a periphery or outside a footprint of) the display area DA. In the display area DA, light may be emitted from an emission area or an opening area of each pixel SP to display an image. To this end, each of the pixels SP in the display device DA may include a pixel circuit including switching elements, a pixel-defining layer that defines the emission area or the opening area, and a self-light-emitting element.

The non-display area NDA may be an edge or an outer area of the display area DA. The non-display area NDA may be defined as the edge of the main area MA of the display panel 100. In the non-display area NDA, the scan driver 300, the data driver 400 and fan-out lines that connect the timing controller 500 with the display area DA may be formed.

The subsidiary area SBA may be extended from one side of the main area MA. The subsidiary area SUB may be formed as a film made of a flexible material that can be bent, folded, or rolled. For example, when the subsidiary area SBA is bent, the subsidiary area SBA may overlap the main area MA in the thickness direction (z-axis direction). The subsidiary area SBA may include pads connected to the data driver 400 and the circuit board 501. Optionally, the subsidiary area SBA may be eliminated, and the data driver 400 and the pads may be located in the non-display area NDA.

The data driver 400 may be implemented as a plurality of integrated circuits (IC) and may be attached on the display panel 100 by a chip-on-glass (COG) technique, a chip-on-plastic (COP) technique, or ultrasonic bonding. For example, the data driver 400 may be located in the subsidiary area SBA and may overlap with the main area MA in the thickness direction (z-axis direction) as the subsidiary area SBA is bent. For another example, the data driver 400 may be mounted on the circuit board 501.

The circuit board 501 may be electrically connected to the pads of the display panel 100 by an anisotropic conductive film (ACF). To this end, lead lines of the circuit board 501 may be electrically connected to the pads of the display panel 100. The circuit board 501 may be a flexible printed circuit board (FPCB), a printed circuit board (PCB), or a flexible film such as a chip-on-film (COF).

Incidentally, the timing controller 500, the deterioration compensator 200 and the compensation supporter 101 may mounted on the circuit board 501. The timing controller 500, the deterioration compensator 200 and the compensation supporter 101 may be implemented as a one-chip integrated circuit (IC).

Figure 3:
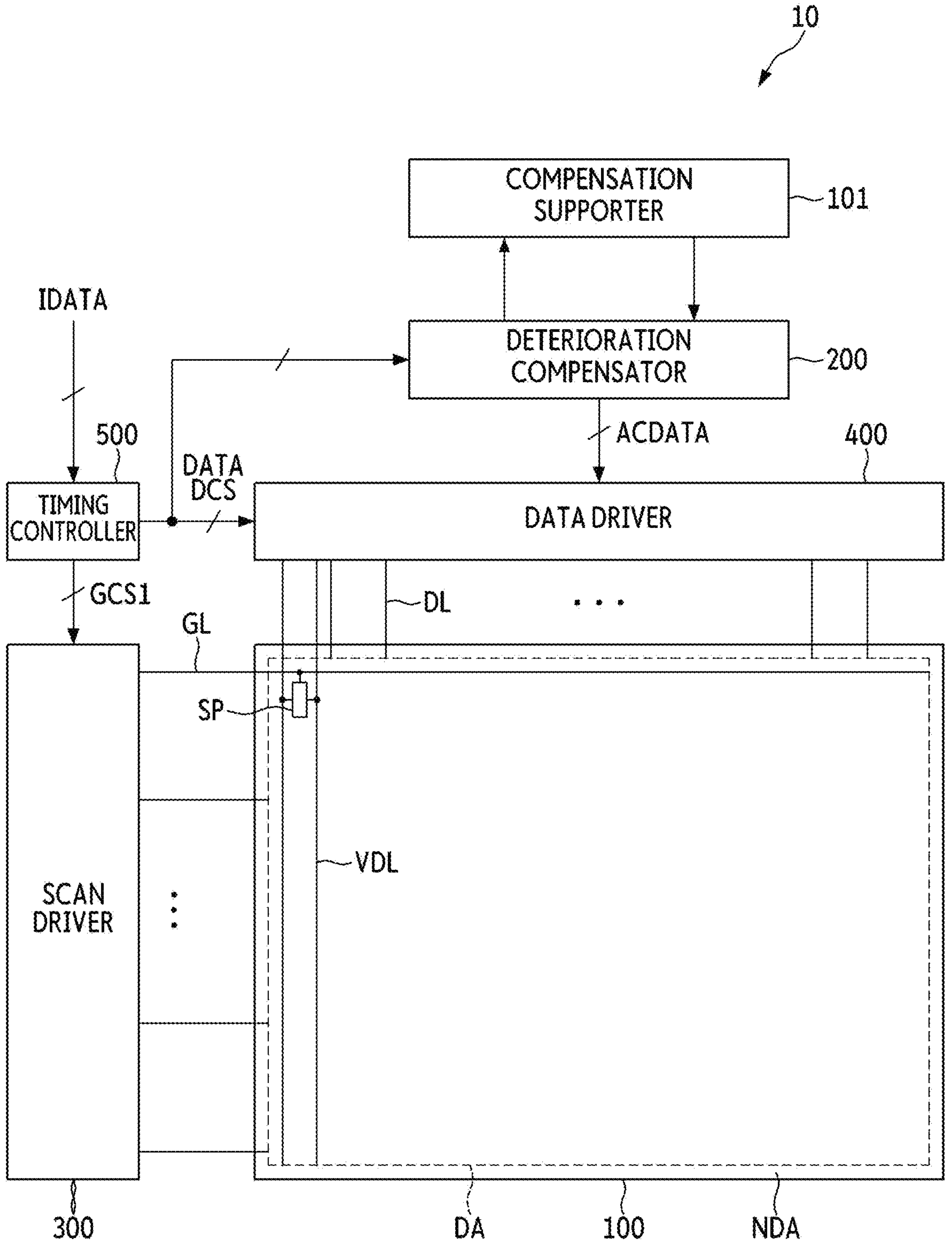
FIG. 3 is a block diagram showing the electrical connection relationship between the display panel and the drivers shown in FIGS. 1 and 2.

FIG. 3 is a block diagram showing the electrical connection relationship between the display panel and the drivers shown in FIGS. 1 and 2.

Referring to FIG. 3, a plurality of pixels SP is arranged in a matrix in the display area DA. In addition, in the display area DA and the non-display area NDA, a plurality of gate lines GL connected to the pixels SP for each horizontal line and a plurality of data lines DL connected to the pixels SP for each vertical line are arranged.

The plurality of gate lines GL may be extended in the x-axis direction that is the horizontal direction and may be spaced apart from one another in the vertical direction crossing the horizontal direction. The plurality of gate lines GL may be equally spaced apart from one another in the vertical direction.

The scan driver 300 sequentially provides gate scan signals to the pixels SP for each horizontal line through the respective gate lines GL based on a gate control signal GCS from the timing controller 500. The plurality of gate lines GL sequentially provides the pixels SP for each horizontal line with the gate scan signals generated sequentially for each horizontal cycle from the scan driver 300.

In the display area DA and the non-display area NDA, a plurality of data lines DL connected to the pixels SP for each vertical line are arranged in each vertical line, and a plurality of data lines DL is electrically connected to the data driver 400. The data voltage may determine the luminance of light emitted from each of the plurality of pixels SP.

The timing controller 500 receives timing synchronization signals through an external graphics system, etc., and sequentially receives interpolation image data (RGB) of each of the pixels SP from the graphics system, etc. The timing controller 500 sequentially sorts the interpolation image data (RGB) of each of the pixels SP that is sequentially input at least every frame.

The timing controller 500 controls the operation timing of the data driver 400 by generating a data drive control signal DCS based on timing synchronization signals. In doing so, the timing controller 500 sequentially provides input image data RGB sorted at least every frame to the deterioration compensator 200, and also provides data drive control signals DCS to the data driver 400, to control the operation timing of the data driver 400. In addition, the timing controller 500 generates gate drive control signals GCS to provide them to the scan driver 300, thereby controlling the operation timing of the scan driver 300.

The data driver integrated circuits of the data driver 400 outputs data voltages according to the compensated image data ACDATA to the pixels SP of the display unit DU based on the data drive control signal DCS. The data driver integrated circuits may provide data voltages for each horizontal line every horizontal cycle to the data lines DL connected to the pixels SP.

The deterioration compensator 200 may generate and output deterioration-compensated image data (hereinafter referred to as compensated image data ACDATA) based on deterioration index data obtained by accumulating deterioration indices and the input grayscale level of input image data IDATA. The deterioration compensator 200 may individually determine a compensation value depending on the grayscale level to be displayed by each of the pixels SP.

According to some embodiments of the present disclosure, the deterioration compensator 200 calculates deterioration weights based on the input image data IDATA and calculates deterioration data based on the deterioration weights at least every frame. Then, the deterioration compensator 200 accumulates the deterioration data to generate deterioration index data indicating the accumulated deterioration data. In addition, the deterioration compensator 200 scales and modulates the pixel-specific grayscale values of the input image data IDATA based on a scaling ratio corresponding to the scale of the deterioration index data. Then, the deterioration compensator 200 determines grayscale compensation values corresponding to the respective pixel-specific grayscale values of the scaled and modulated input image data IDATA, and compensates and modulates the input image data IDATA with the grayscale compensation values. In this way, the compensated and modulated image data ACDATA is provided to the data driver 400 at least every horizontal line.

According to some embodiments of the present disclosure, the deterioration compensator 200 may be implemented as a microprocessor, such as a separate application processor (AP). The deterioration compensator 200 may be formed integrally with the timing controller 500, that is, as a one-chip. According to some embodiments, the deterioration compensator 200 may be formed integrally with the data driver 400, and the timing controller 500, the deterioration compensator 200 and the data driver 400 may be formed as a one-chip.

According to some embodiments of the present disclosure, deterioration data including deterioration weights and the deterioration index data indicating the accumulated deterioration data may be stored in the memory-type compensation supporter 101. The deterioration compensator 200 may calculate grayscale compensation values using a lookup table or a compensation grayscale calculation function.

According to some embodiments of the present disclosure, the deterioration compensator 200 sets a plurality of deterioration values (e.g., set or predetermined deterioration values) corresponding to deterioration index data. Then, the deterioration compensator 200 stores the grayscale compensation values respectively corresponding to display grayscale values that can be displayed by the display panel 100 in a plurality of lookup tables. Additionally, the deterioration compensator 200 matches the scaled grayscale values of the input image data with the deterioration index data stored in the plurality of lookup tables to determine and extract the grayscale compensation values for each scaled grayscale value. In addition, the deterioration compensator 200 modulates the scaled grayscale values according to the grayscale compensation values to generate the compensated image data ACDATA. By doing so, the computational burden can be relatively reduced because the grayscale compensation values are determined through the lookup tables, and the logic for determining the grayscale compensation values can be simplified.

According to some embodiments, the deterioration compensator 200 calculates luminances for the scaled grayscale values of input image data using a reference grayscale-luminance function (e.g., a set or predetermined reference grayscale-luminance function). Then, the deterioration compensator 200 may correct the reference grayscale-luminance function with a target function corresponding to the deterioration index data and the current temperature of the display panel 100, and may calculate the inverse function of the target function to calculate a grayscale compensation value corresponding to the target luminance. In this instance, the grayscale compensation value can be calculated through calculation using a function (e.g., a set or predetermined function). Accordingly, a memory such as a lookup table is not required, and thus the size of storage members such as a memory can be relatively reduced.

Figure 4:
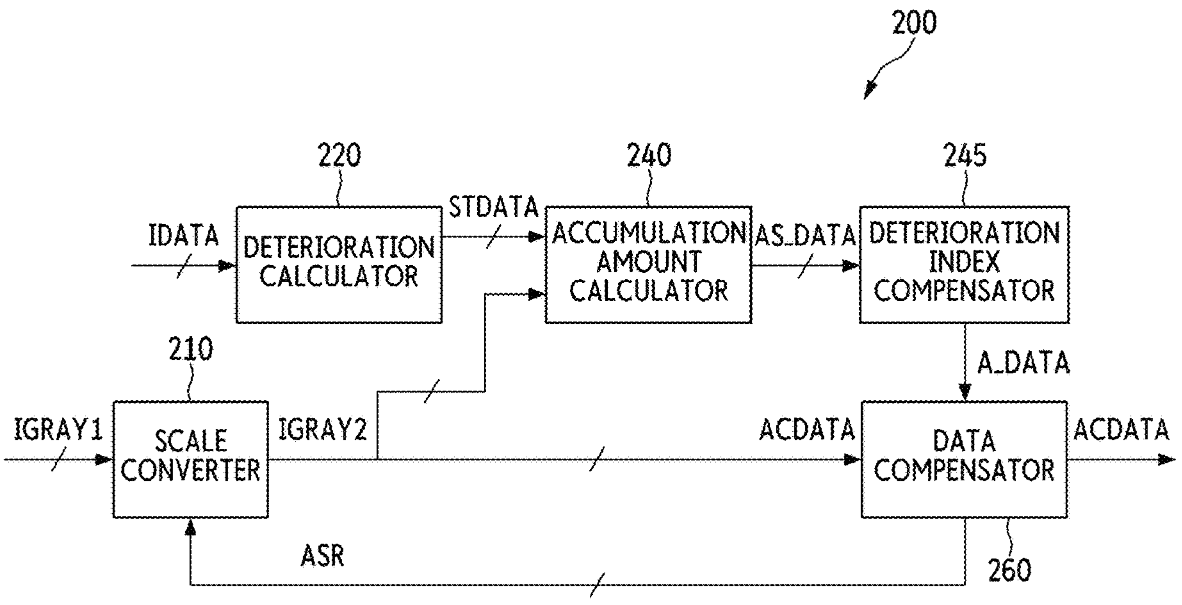
FIG. 4 is a block diagram for illustrating the deterioration compensator according to some embodiments of the present disclosure.
Figure 5:
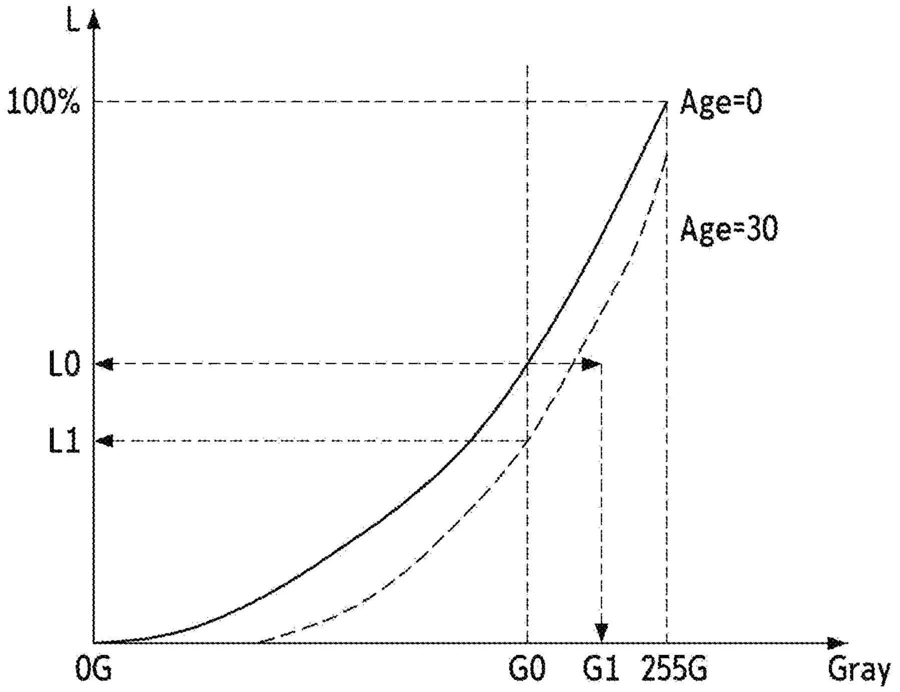
FIG. 5 is a graph showing a method for calculating deterioration indices and compensating for deterioration by the deterioration compensator shown in FIG. 4.

FIG. 4 is a block diagram for illustrating the deterioration compensator according to some embodiments of the present disclosure. FIG. 5 is a graph showing a method for calculating deterioration indices and compensating for deterioration by the deterioration compensator shown in FIG. 4. FIG. 5 shows the relationship between grayscale and luminance changes according to deterioration or accumulation of deterioration indices.

Initially, referring to FIG. 4, the deterioration compensator 200 includes a scale converter 210, a deterioration calculator 220, an accumulation amount calculator 240, a deterioration index compensator 245, and a data compensator 260.

The deterioration compensator 200 compensates for the pixel-specific grayscale values of the input image data IDATA in order to prevent or reduce image sticking due to accumulation of deterioration.

Referring to FIG. 5, initially (i.e., Age=0), when an input grayscale corresponding to a first grayscale level G0 is input, the pixel may emit light with a first luminance L0 corresponding to it. However, as the pixel deteriorates (e.g., from Age=0 to Age=30 on the graph), the luminance may be lowered to a second luminance L1 when the first grayscale level G0 is input. Therefore, in order to emit light with the first luminance L1, the deterioration compensator 200 may compensate for the pixel-specific grayscale value of the input image data IDATA to a second grayscale G1.

The deterioration calculator 220 may calculate deterioration weights based on the input image data IDATA and calculate deterioration data STDATA at least for each frame (e.g., the current frame). The deterioration calculator 220 may calculate the deterioration weights depending on the characteristics or conditions of the display panel 100. According to some embodiments of the present disclosure, the deterioration weights may be calculated based on at least one criterion requirement of: the location of a pixel inside the display panel 100, the input grayscale level, the current temperature of the display panel, the emission duty of the pixel, and the emission frequency. The deterioration calculator 220 provides deterioration data STDATA of the current frame (or the previous frame) including the deterioration weights to the accumulation amount calculator 240.

Figure 6:
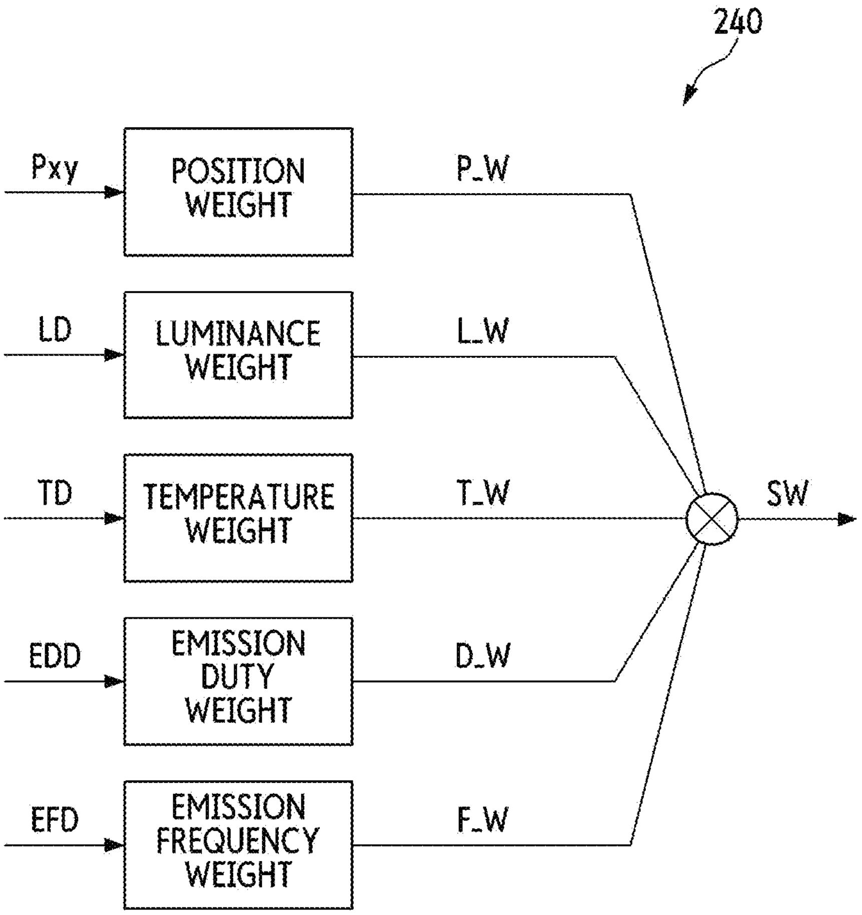
FIG. 6 is a block diagram showing further details of a configuration of the deterioration calculator shown in FIG. 4.

FIG. 6 is a block diagram showing in detail the configuration of the deterioration calculator shown in FIG. 4.

Referring to FIG. 6, the deterioration calculator 220 may calculate a deterioration weight SW based on the input image data IDATA and criterion requirements (e.g., set or predetermined criterion requirements). The input image data IDATA may include information about the position coordinates Pxy of each pixel SP, the luminance value LD, the emission duty ratio EDD, and the emission frequency EFD. Furthermore, the deterioration calculator 220 may further receive the current temperature data TD of the display panel detected from an external temperature detector. The deterioration calculator 220 may calculate at least one value of: the position weight P_W associated with the position Pxy of the pixel, the luminance weight L_W associated with the luminance value LD, the emission duty weight D_W associated with emission duty ratio EDD, the emission frequency weight F_W associated with the emission frequency EFD, and the temperature weight T_W associated with the current temperature TD of the display panel 100 by using a predetermined memory, etc. In other words, the deterioration weight PW may include at least one of the position weight P_W, the luminance weight L_W, the duty weight D_W, the emission frequency weight F_W, or the temperature weight T_W. The position weight P_W associated with the position Pxy of the pixel, the luminance weight L_W associated with the luminance value LD, the emission duty weight D_W associated with the emission duty ratio EDD, the emission frequency weight F_W associated with the emission frequency EFD, and the temperature weight T_W associated with the current temperature TD of the display panel 100 may be obtained from experiments of different display panels and may be stored in advance. In this manner, the deterioration calculator 220 can calculate deterioration data STDATA at least every frame based on the deterioration weights PW.

The accumulation amount calculator 240 sequentially accumulates the deterioration data STDATA at least every frame and generates deterioration index data AS_DATA containing the count of the accumulated deterioration data STDATA. The deterioration index data AS_DATA may include information about the count of deterioration (or lifespan information) for each pixel SP. For example, the information about the count may include a plurality of deterioration values (or deterioration indices) as 10-bit data and the count.

Figure 7:
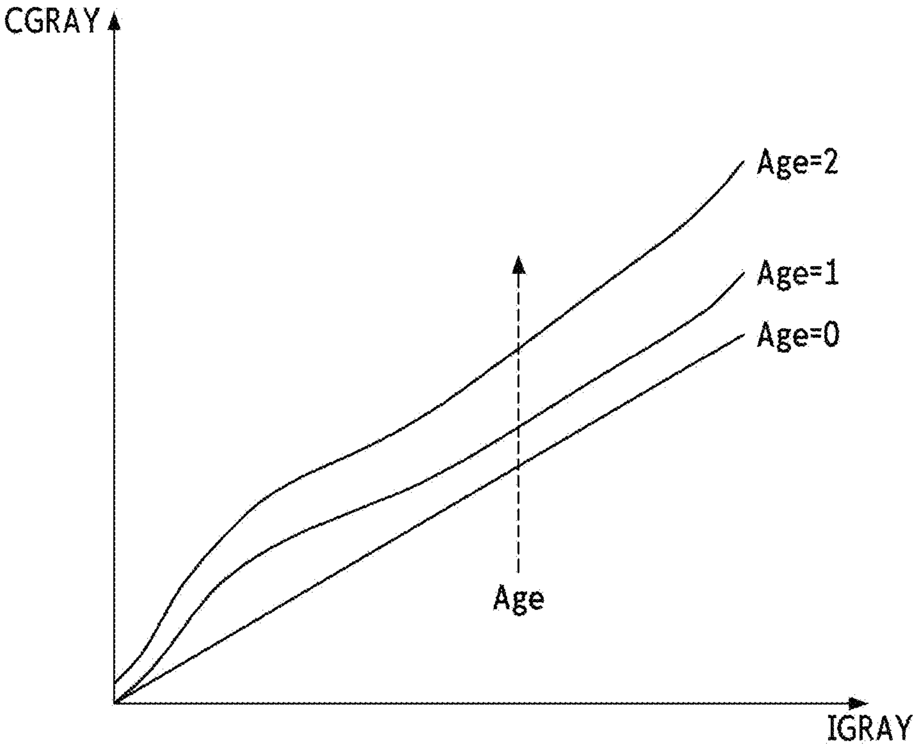
FIG. 7 is a graph showing the relationship between input grayscale level and output grayscale level according to accumulated deterioration of pixels.

FIG. 7 is a graph showing the relationship between input grayscale level and output grayscale level according to accumulated deterioration of pixels.

Referring to FIG. 7, as the deterioration data SDATA is accumulated by the accumulation amount calculator 240, the amount of deterioration increases and the counts included in the deterioration index data AS_DATA may increase. For example, the deterioration index may be increased and counted in the order from Age=0, Age=1, Age=2 and so on. Therefore, as the deterioration of the pixels SP progresses, the size of the correction grayscale CGRAY (for example, the grayscale compensation value CGRAY of deterioration compensation data) for displaying an input grayscale level IGRAY have to increase.

The accumulation amount calculator 240 may update the deterioration index data AS_DATA by matching and accumulating the deterioration data STDATA and the scaled grayscale level IGRAY2 of at least one frame. In other words, the grayscale compensation value CGRAY may correspond to a grayscale level compensated to display an input grayscale level IGRAY at a particular deterioration index corresponding to the deterioration index data AS_DATA. The accumulation amount calculator 240 may provide deterioration index data AS_DATA updated in real time to the deterioration index compensator 245. According to some embodiments of the present disclosure, the accumulation amount calculator 240 may match the deterioration data STDATA with the deterioration index data AS_DATA at each grayscale level to be in the scaled grayscale level IGRAY2 range, store and accumulate them, to update the deterioration index data AS_DATA.

Figure 8:
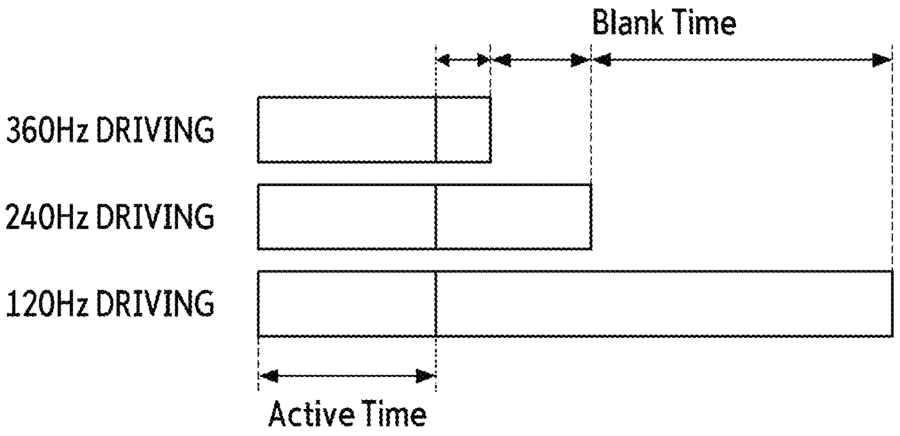
FIG. 8 is a graph showing a method for compensating for deterioration index by the deterioration index compensator shown in FIG. 4.
Figure 9:
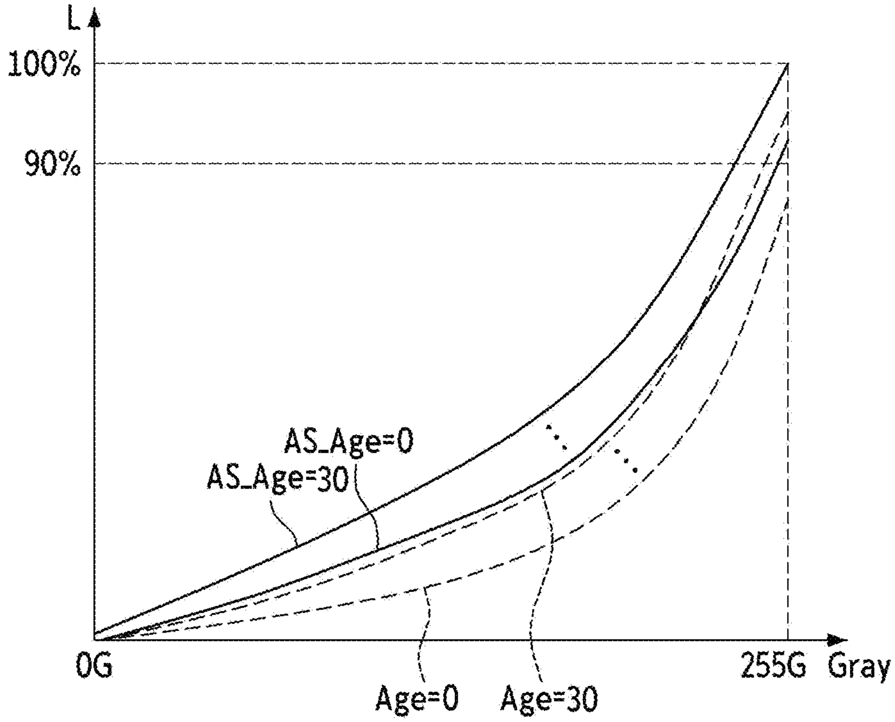
FIG. 9 is a graph for illustrating the deterioration index compensation conditions of the deterioration index compensator according to some embodiments.

FIG. 8 is a graph showing a method for compensating for deterioration index by the deterioration index compensator shown in FIG. 4. FIG. 9 is a graph for illustrating the deterioration index compensation conditions of the deterioration index compensator according to some embodiments.

Referring to FIGS. 8 and 9, the deterioration index compensator 245 receives deterioration index data AS_DATA in real time from the accumulation amount calculator 240, and corrects the count of accumulated deterioration of the deterioration index data AS_DATA according to the driving frequency of the display panel 100 and the image display period or image blank period for each frame.

The driving frequency 100 may be set to 60 Hz, 120 Hz, 240 Hz, 360 Hz, etc., in advance or may be changed to 60 Hz, 120 Hz, 120 Hz, 240 Hz, and 360 Hz depending on display panels. Accordingly, the timing controller 500 aligns the input image data IDATA at least every frame depending on the driving frequency of the display panel 100 and the resolution of the display panel 100, and provides the aligned input image data IDATA to the deterioration compensator 200. Additionally, the timing controller 500 generates gate and data drive control signals GCS and DCS to correspond to the driving frequency of the display panel 100, and controls the timing of outputting data voltage from the data driver 400 and the timing of outputting gate scan signals from the scan driver 300.

The timing controller 500 sets an image display period (Active Time) and a blank period (Blank Time) for each frame based on the driving frequency of the display panel 100. In addition, the timing controller 500 generates and outputs gate and data drive control signals GCS and DCS to match the image display period (Active Time) and the blank period (Blank Time) for each frame. Therefore, the pixels SP may be driven only during the image display period (Active Time) for each frame.

TABLE 1

| Driving | Max 360 Hz Mode | | | Max 240 Hz Mode | | |
|---|---|---|---|---|---|---|
| Frequency (Hz) | HTOTAL | VTOTAL | Ratio Weight | HTOTAL | VTOTAL | Ratio Weight |
| 360 | 2500 | 1500 | 100% | | | |
| 240 | 2500 | 3500 | 100% | 4000 | 2000 | 93% |
| 120 | 2500 | 9500 | 100% | 4000 | 8000 | 97% |
| 60 | 2500 | 21500 | 100% | 4000 | 20000 | 96% |
| 48 | 2500 | 27500 | 100% | 4000 | 26000 | 96% |

Referring to Table 1 along with FIGS. 8 and 9, the image display period (Active Time) and blank period (Blank Time) may be set differently for different frames depending on the driving frequency of the display panel 100. For example, in a particular frequency band (e.g., a set or predetermined particular frequency band), the ratio weight for the blank period (Blank Time) may be set differently depending on the driving frequency. As such, as the ratio weight for the blank period (Blank Time) is set differently depending on the driving frequency, the vertical driving period VTOTAL according to the data drive control signal DCS compared to the horizontal driving period HTOTAL according to the gate drive control signal GCS may be variable.

As the vertical driving period VTOTAL is set differently or varied depending on the driving frequency, the deterioration characteristics and deterioration index may vary depending on the display panels. When this happens, errors may occur or the displayed image may be distorted due to deterioration compensation. In order to prevent or reduce such distortion, the deterioration index compensator 245 varies or corrects the count of accumulated deterioration of the deterioration index data AS_DATA received in real time from the accumulation amount calculator 240 depending on the driving frequency of the display panel 100 and the image display period (Active Time) or the blank period (Blank Time) for each frame.

Referring to FIGS. 8 and 9, as the deterioration data SDATA is accumulated by the accumulation amount calculator 240, the amount of deterioration increases and the counts included in the deterioration index data AS_DATA may increase. For example, the deterioration index may be increased and counted in the order from Age=0, Age=1, Age=2 and so on. Then, the deterioration index data AS_DATA containing the counted deterioration index is transmitted to the deterioration index compensator unit 245.

The deterioration index compensator 245 corrects the deterioration indices of the deterioration index data AS_DATA calculated by the accumulation amount calculator 240 by increasing or lowering them depending on the driving frequency of the display panel 100.

In other words, the deterioration index compensator 245 may maintain the deterioration index (or the count) of the deterioration index data AS_DATA calculated by the accumulation amount calculator 240 or may correct it by increasing or lowering to the value corresponding to the magnitude of the driving frequency depending on the driving frequency of the display panel 100. For example, the deterioration index compensator 245 may maintain one of the deterioration indices (or the count) from Age=0 to Age=30 calculated by the accumulation amount calculator 240 depending on the reference driving frequency (e.g., the set or predetermined reference driving frequency) of 120 Hz of the display panel 100. On the other hand, the deterioration index compensator 245 may correct one of the deterioration indices (or the count) from Age=0 to Age=30 calculated by the accumulation amount calculator 240 by increasing it to the value corresponding to the driving frequency of 240 Hz as one value of the AS_Age=0 to AS_Age=30. Alternatively, the deterioration index compensator 245 may correct one of the deterioration indices (or the count) from Age=0 to Age=30 calculated by the accumulation amount calculator 240 by lowering it to the value corresponding to the driving frequency of 600 Hz as a lower value. The deterioration index compensator 245 provides compensated deterioration index data A_DATA containing the changed deterioration index to the data compensator 260.

Figure 10:
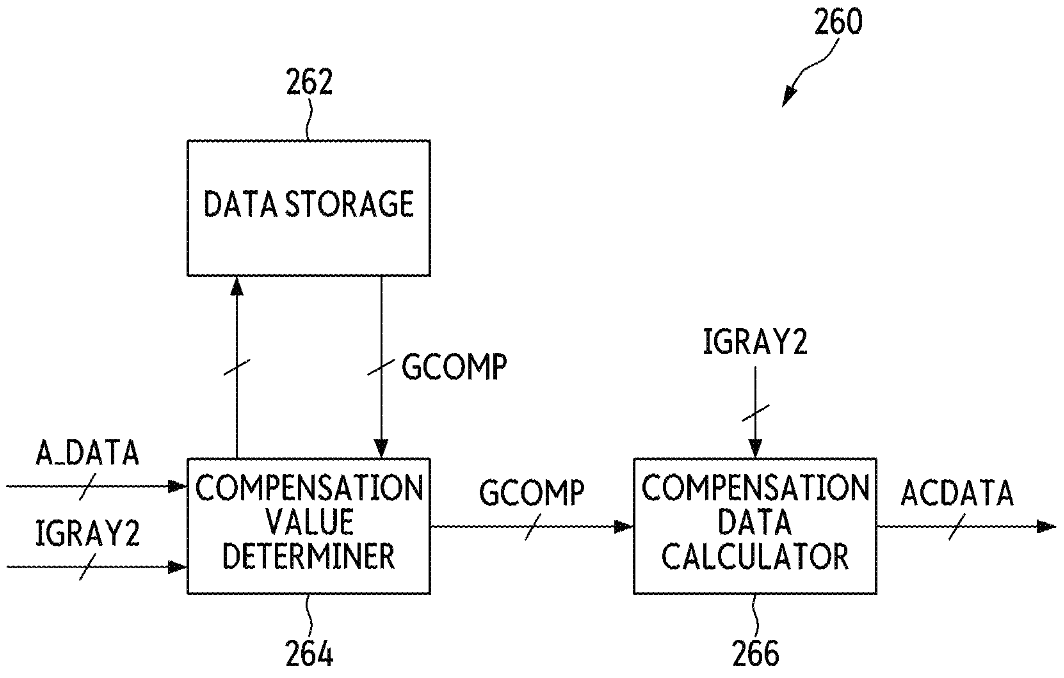
FIG. 10 is a block diagram for illustrating further details of a configuration of the data compensator shown in FIG. 4.

FIG. 10 is a block diagram for illustrating in detail the configuration of the data compensator shown in FIG. 4.

Referring to FIG. 10, the data compensator 260 includes a data storage 262, a compensation value determiner 264, and a compensation data calculator 266.

The data storage 262 may include a plurality of lookup tables in which deterioration indices of the deterioration index data A_DATA compensated by the deterioration index compensator 245 and deterioration compensation values corresponding to display grayscale levels that can be displayed in the display panel 100 are set. One lookup table may include compensation values each corresponding to a deterioration index as well as a grayscale level. According to some embodiments of the present disclosure, lookup tables may be distinguished by the colors of pixels included in the display panel and the temperature (e.g., the set or predetermined temperature) of the display panel. The data storage 262 may include a static random access memory (SRAM) or a dynamic random access memory (DRAM) for storing the lookup tables.

The compensation value determiner 264 may determine the grayscale compensation value GCOMP corresponding to the compensation deterioration index data A_DATA and the scaled grayscale IGRAY2 from the lookup tables. According to some embodiments of the present disclosure, the compensation value determiner 264 may select one of the lookup tables based on the current temperature of the display panel 100 and the colors of the pixels. The compensation value determiner 264 may determine the grayscale compensation value GCOMP corresponding to the compensated deterioration index data A_DATA and the scaled grayscale level IGRAY2 from the selected lookup table. Accordingly, the grayscale compensation value GCOMP can be obtained, which reflects the color of the light emitted from the pixel, the degree of deterioration (lifespan), the temperature and the grayscale to be displayed.

The compensation data calculator 266 may apply the grayscale compensation value GCOMP to the scaled grayscale IGRAY2 and output the compensated image data ACDATA. The compensated image data ACDATA may have a digital form defined in the grayscale domain. The compensated image data ACDATA may be converted into an analog form defined in the voltage domain to be provided to the display panel through a separate gamma corrector.

As described above, the deterioration compensator 200 includes the data compensator 260 that calculates the optimized grayscale compensation value GCOMP depending on the accumulated and corrected deterioration index data A_DATA and the grayscale level, thereby relatively improving (e.g., greatly improving) the precision of afterimage compensation. In addition, all of the grayscale levels can be compensated individually. Therefore, no afterimage is recognized at all of the grayscale levels. Additionally, because the grayscale compensation value GCOMP is set in a plurality of lookup tables, the compensation logic can be simplified and thus can be easily designed.

Figure 11:
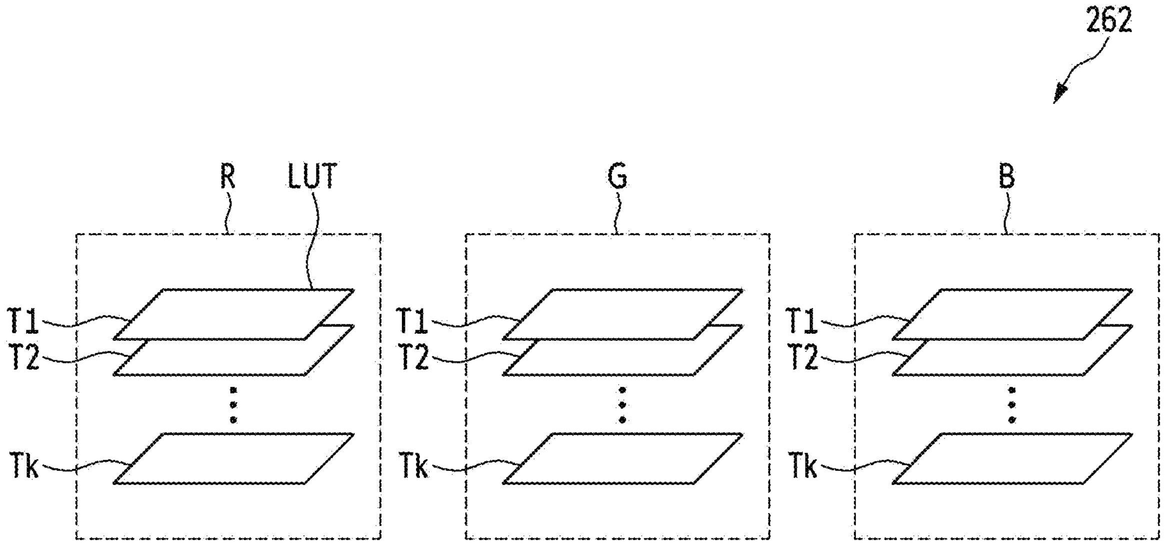
FIG. 11 is a block diagram for illustrating an example of lookup tables included in the data storage of FIG. 10.

FIG. 11 is a block diagram for illustrating an example of lookup tables included in the data storage of FIG. 10.

Referring to FIG. 11, the deterioration compensator 200 may determine a grayscale compensation value GCOMP using lookup tables.

The data storage 262 may include a plurality of lookup tables LUT. The lookup tables LUT may be individually set depending on the emission color of the pixels and the temperature of the display panel. For example, the emission colors may be divided into red, green and blue. The lookup tables LUT may be sorted into a first table group R applied to red pixels, a second table group G applied to green pixels, and a third table group B applied to blue pixels. Furthermore, the first to third table groups R, G and B may each include a plurality of lookup tables LUT associated with temperatures (e.g., set or predetermined temperatures). For example, each of the table group R, G and B may include lookup tables associated with the first to $k^{th}$ set temperatures T1 to Tk, respectively. The first to $k^{th}$ set temperatures T1 to Tk may each include a specific temperature range or specific temperature values. According to some embodiments of the present disclosure, the grayscale compensation value GCOMP for a certain temperature may be calculated using interpolation between the lookup tables.

In the lookup table LUT corresponding to a first temperature T1 and a red pixel, a plurality of deterioration indices (e.g., set or predetermined deterioration indices) AGE and compensation values corresponding to display grayscale levels GRAY that can be displayed by the display panel. FIG. 11 shows lookup tables in which the display grayscale is divided into 256 levels (i.e., 8 bits) and is compensated with 13-bit compensation values (i.e., compensation grayscale). In addition, the lifespan values AGE may be divided into 1,024 levels (i.e., 10 bits) according to the accumulation of deterioration.

The corrected deterioration index data A_DATA received by the compensation value determiner 264 may correspond to one of the deterioration index counts (Age). It should be understood, however, that this is merely illustrative. The size of the bits representing the display grayscale, the compensation values, and the lifespan values is not limited thereto.

FIG. 12 is a block diagram for illustrating an example of the compensation data stored in the data storage of FIG. 10.

Referring to FIG. 12, a lookup table LUT may include scaling ratios ASR associated with deterioration indices Age, respectively. According to some embodiments of the present disclosure, the data compensator 260 may provide the scaling ratios ASR associated with the deterioration index data A_DATA to the scale converter 210. The scale converter 210 may scale an input grayscale level IGRAY1 with a scaling ratio ASR to generate a scaled grayscale level IGRAY2. Specifically, as shown in FIG. 12, the compensation values become saturated at 1,892 as the deterioration index Age increases. In order to prevent or reduce this, the input grayscale level IGRAY1 may be downscaled with the scaling ratio ASR according to the lifespan value AGE.

Figure 13:
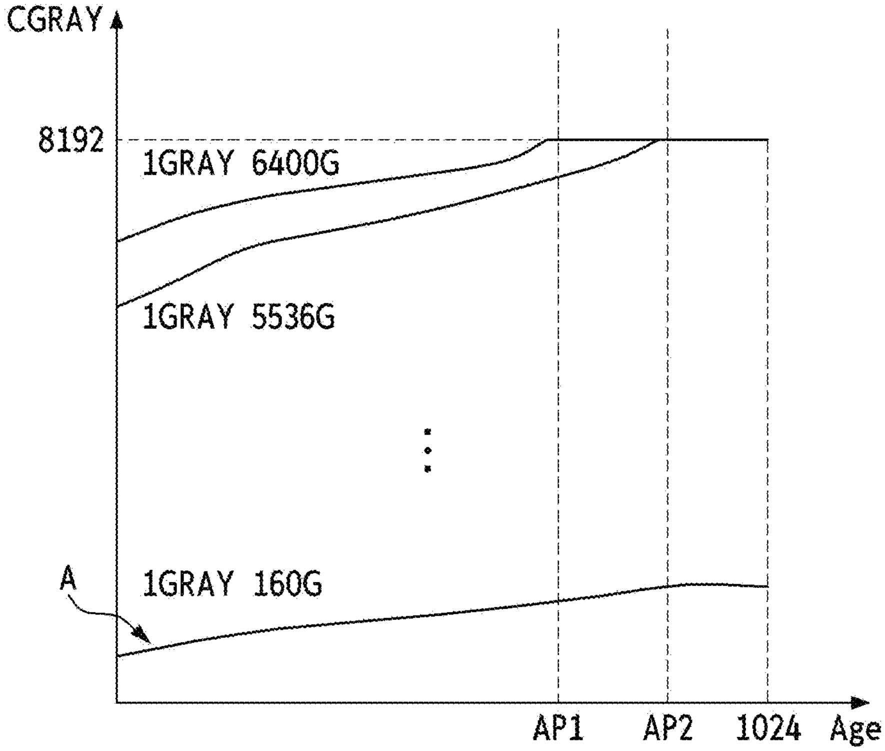
FIG. 13 is a graph showing an example of deterioration compensation data set by the lookup table of FIG. 12.

FIG. 13 is a graph showing an example of deterioration compensation data set by the lookup table of FIG. 12.

FIG. 13 shows the relationship between deterioration index data A_DATA and the grayscale compensation value GCOMP included in the compensated image data ACDATA. Specifically, as the amount of accumulated deterioration increases, the grayscale compensation value CGRAY of the compensated image data ACDATA may increase. For example, as deterioration accumulates, the grayscale compensation value CGRAY increases to display a 64-grayscale level image. It should be noted that the maximum compensation value is applied from the first lifespan value (indicated by AP1) for 5,536 grayscale levels, so that the grayscale compensation value CGRAY is saturated. Therefore, the lifespan data after the first lifespan value AP1 cannot be accurately compensated, and the display grayscale and luminance for the input grayscale level of 5,536 may be relatively reduced. After the second lifespan value (indicated by AP2), the grayscale compensation values CGRAY for 6,400 grayscale level and 5,536 grayscale level are the same.

In order to address such a problem, the scale converter 210 may be employed. The scale converter 210 may apply a scaling ratio ASR corresponding to each of the deterioration indices Age to the input image data IDATA to scale pixel-specific grayscale values of the input image data IDATA. Accordingly, the saturated area in the graph of FIG. 13 is removed, and thus afterimage can be precisely compensated. For example, if the lifespan value corresponding to the deterioration index data A_DATA is 5 (i.e., AGE=5), the input grayscale may be multiplied by the scaling ratio of 0.982.

Figure 14:
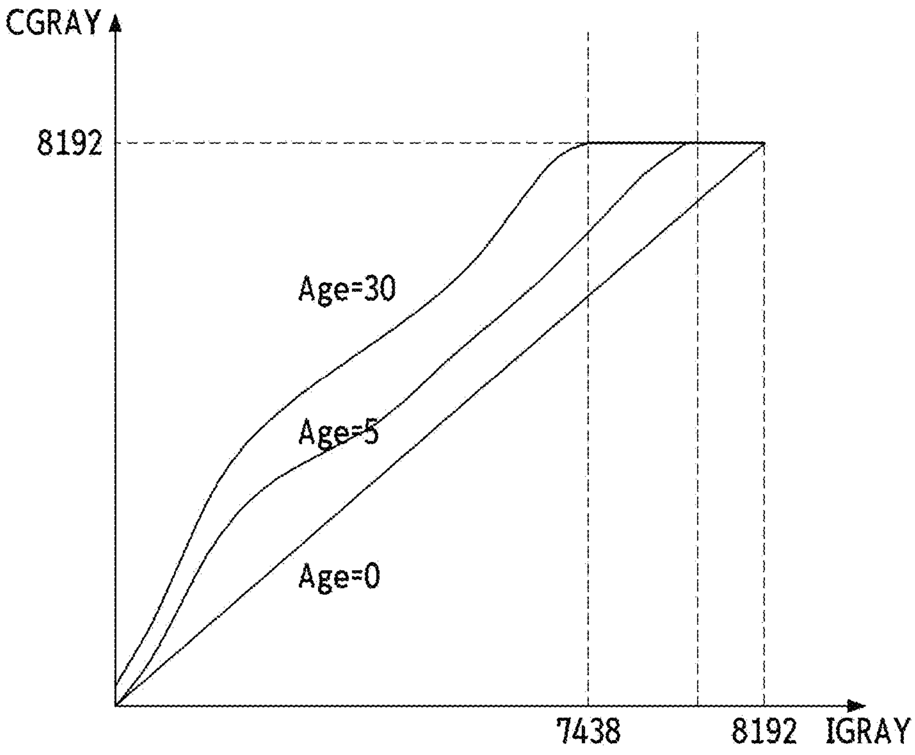
FIG. 14 is a graph showing another example of deterioration compensation data set by the lookup table of FIG. 12.

FIG. 14 is a graph showing another example of deterioration compensation data set by the lookup table of FIG. 12.

Specifically, FIG. 14 shows the relationship between the input grayscale level IGRAY of the input grayscale level data IGDATA1 of the input image data IDATA and the grayscale compensation value CGRAY. When the deterioration index is 30 (i.e., AGE=30), the grayscale compensation value CGRAY of the lifespan compensation data may be saturated from approximately 7,438 grayscale level of the input grayscale level IGARY. At this time, the scale converter 210 may apply a scaling ratio ASR corresponding to the deterioration index to the input grayscale level IGRAY to remove the saturated area. By doing so, afterimage can be precisely compensated throughout the entire grayscale range.

FIG. 15 is a diagram for illustrating an example of additionally applying position weights to deterioration data in the data compensator of FIG. 4.

Referring to FIG. 15, the data compensator 260 may divide the display panel 100 into a plurality of blocks and set block weights for each of the blocks. For example, as shown in FIG. 15, the display panel 100 may be divided into k×j blocks, and block weights (e.g., set or predetermined block weights) may be assigned to each of the blocks.

The data compensator 260 may further apply the weights of the blocks corresponding to the positions of the pixels to the compensated deterioration index data A_DATA received from the deterioration index compensator 245. The data compensator 260 may determine the grayscale compensation value GCOMP based on the compensated deterioration index data A_DATA to which the block weights have been applied. For example, the data compensator 260 may determine the grayscale compensation value GCOMP based on the deterioration index Age and the deterioration index Age and corresponding to the compensated deterioration index data A DATA to which the block weights have been applied.

Figure 16:
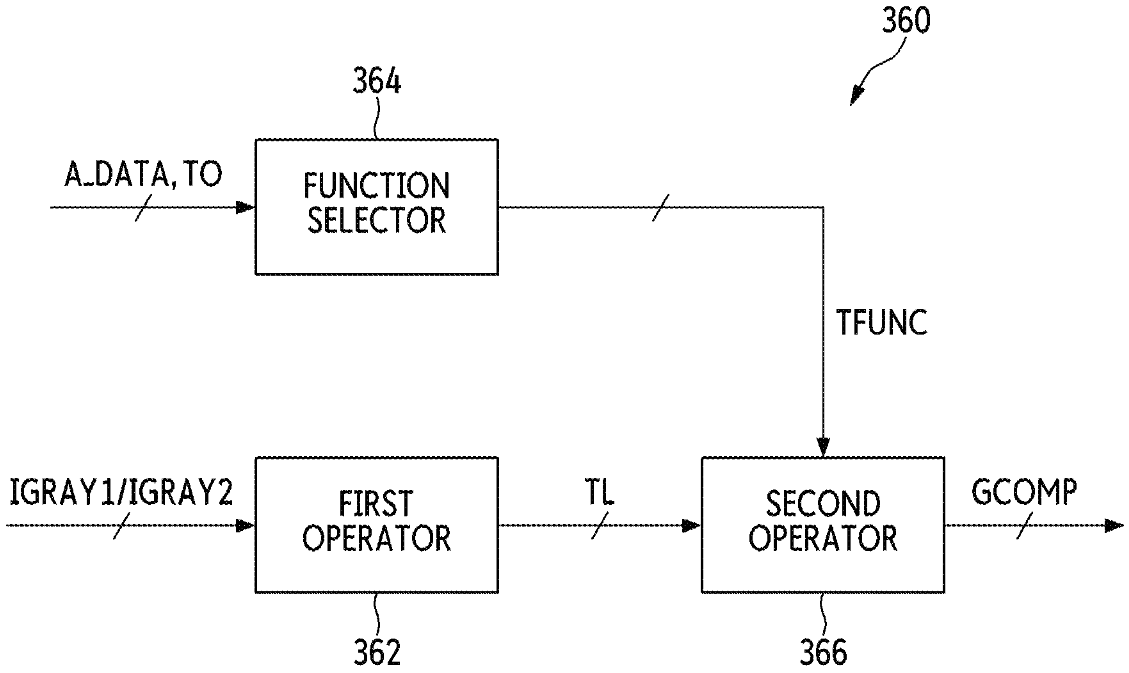
FIG. 16 is a block diagram for illustrating in detail another configuration of the data compensator included in the deterioration compensator of FIG. 4.
Figure 17:
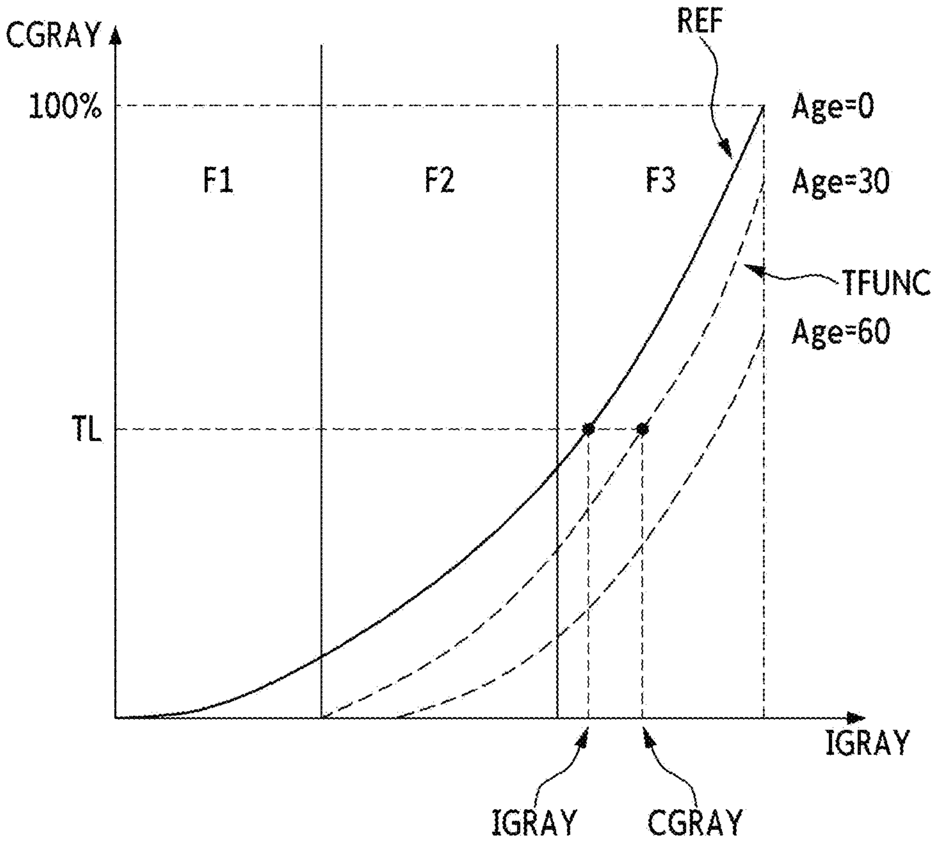
FIG. 17 is a graph for illustrating a method for compensating for deterioration data by the data compensator shown in FIG. 16.

FIG. 16 is a block diagram for illustrating in detail another configuration of the data compensator included in the deterioration compensator of FIG. 4. FIG. 17 is a graph for illustrating a method for compensating for deterioration data by the data compensator shown in FIG. 16.

Referring to FIGS. 16 and 17, the data compensator 260 may include a first operator 362, a function selector 364, and a second operator 366.

The data compensator 260 may generate and output a grayscale compensation value GCOMP and compensated image data ACDATA using a function other than a lookup table.

The first operator 362 may calculate a target luminance TL corresponding to the input grayscale level IGRAY1 or the scaled grayscale level IGRAY2 using a reference grayscale-luminance function (e.g., a set or predetermined reference grayscale-luminance function) REF. According to some embodiments of the present disclosure, as shown in FIG. 17, the reference grayscale-luminance function REF may correspond to a grayscale-luminance curve at the initial state (i.e., AGE=0). The grayscale-luminance function expresses the relationship between grayscale data and the luminance output by the display panel corresponding thereto.

The function selector 364 may adjust the reference grayscale-luminance function REF with a target function TFUNC corresponding to the lifespan data A_DATA and the current temperature of the display panel. According to some embodiments of the present disclosure, as shown in FIG. 17, if the lifespan data A_DATA corresponds to the lifespan value of AGE=30, the reference grayscale-luminance function REF may be adjusted in the form of the target function TFUNC. Therefore, in order to emit light at the target luminance TL, the input grayscale level IGRAY1 or the scaled grayscale level IGRAY2 must be changed to the grayscale compensation value CGRAY.

According to some embodiments of the present disclosure, grayscale levels may be divided into a plurality of grayscale sections. Herein, the reference grayscale-luminance function REF and the target function TFUNC may include a plurality of different auxiliary functions F1, F2 and F3 respectively defined for the grayscale sections. Accordingly, the compensation can be performed more precisely according to the grayscale levels. According to some embodiments of the present disclosure, the auxiliary functions F1, F2 and F3 may be consecutive to each other. For example, the reference grayscale-luminance function REF and/or the target function TFUNC may correspond to a combination of quadratic or cubic functions.

The second operator 366 may calculate the grayscale compensation value CGRAY corresponding to the target luminance TL by calculating the inverse function of the target function TFUNC. That is to say, by using simple logic to calculate the inverse function of the target function TFUNC, the grayscale compensation value CGRAY corresponding to each input grayscale level can be relatively easily calculated using the simple logic that calculates the inverse function of the target function TFUNC.

As described above, the deterioration compensator 200 includes the scale converter 210 and the data compensator 260 for calculating the optimized grayscale compensation value GCOMP depending on the accumulated and corrected deterioration index data A_DATA and the input grayscale level IGARY, thereby relatively improving (e.g., greatly improving) the precision of afterimage compensation. In addition, all of the grayscale levels can be compensated individually. Therefore, no afterimage is recognized at all of the grayscale levels. Additionally, because the grayscale compensation value GCOMP is calculated by calculating the functions, the size of the memory required for compensating image sticking can be relatively reduced, thereby saving fabrication costs.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

In concluding the detailed description, those skilled in the art will appreciate that many variations and modifications can be made to the disclosed embodiments without substantially departing from the spirit and scope of embodiments according to the present disclosure. Therefore, the disclosed embodiments of the present disclosure are used in a generic and descriptive sense only and not for purposes of limitation.

What is claimed is:

1. A display device comprising:

a display panel having a plurality of pixels in a display area to display an image;

a scan driver configured to drive gate lines of the display area;

a data driver configured to drive data lines in the display area;

a timing controller configured to sort input image data to match a resolution of the display area and to control driving timing of the scan driver and the data driver; and a deterioration compensator configured to analyze a deterioration index through the sorted input image data, and to generate deterioration-compensated image data based on deterioration index data containing the deterioration index and an input grayscale level of the sorted input image data, to provide it to the data driver, wherein the deterioration compensator comprises:

a deterioration calculator configured to calculate a deterioration weight for the sorted input image data based on the sorted input image data and predetermined reference requirements and to calculate deterioration data containing the deterioration weight, wherein the deterioration compensator is configured to compensate and modulate deterioration indices of the deterioration index data depending on a driving frequency of the display panel, and to generate the deterioration-compensated image data using the deterioration index data containing the compensated and modulated deterioration index and the deterioration data.

2. The display device of claim 1, wherein the deterioration compensator is configured to:

calculate deterioration weights based on the sorted input image data to calculate deterioration data according to the deterioration weights at least every frame;

accumulate the deterioration data to generate deterioration index data indicating the accumulated deterioration data, and scale and modulate pixel-specific grayscale values of the sorted input image data based on a scaling ratio corresponding to a scale of the deterioration index data; and calculate grayscale compensation values of the deterioration compensation data corresponding to each of the pixel-specific grayscale values of the scaled and modulated image data, and to compensate and modulate the sorted input image data with the grayscale compensation values.

3. The display device of claim 1, wherein the deterioration compensator comprises:

a scale converter configured to scale and modulate pixel-specific grayscale values of the sorted input image data based on a scaling ratio corresponding to a scale of the deterioration index data;

an accumulation amount calculator configured to sequentially accumulate the deterioration data at least every frame to generate the deterioration index data containing a count of the accumulated deterioration data;

a deterioration index compensator configured to correct the count of the deterioration index data depending on the driving frequency of the display panel; and a data compensator configured to calculate grayscale compensation values of the deterioration compensation data respectively corresponding to the pixel-specific grayscale values of the scaled and modulated image data, and to compensate and modulate the sorted input image data with the grayscale compensation values.

4. The display device of claim 3, wherein the deterioration index compensator is configured to vary or correct the count of the deterioration index data received in real time from the accumulation amount calculator depending on the driving frequency of the panel and an image display period (Active Time) or a blank period (Blank Time) for each frame.

5. The display device of claim 4, wherein the deterioration index compensator is configured to maintain the deterioration index of the deterioration index data calculated by the accumulation amount calculator depending on the driving frequency of the display panel, or to correct the deterioration index by increasing or lowering it to a value corresponding to the driving frequency.

6. The display device of claim 4, wherein the scale converter is configured to scale the pixel-specific grayscale values of the sorted input image data based on the scaling ratio corresponding to the deterioration index data to prevent a grayscale compensation value from being saturated due to accumulation of the deterioration data, and to generate scaled image data.

7. The display device of claim 3, wherein the data compensator comprises:

a data storage comprising a plurality of lookup tables in which deterioration indices of the deterioration index data compensated by the deterioration index compensator and the deterioration compensation values respectively corresponding to display grayscale levels displayable in the display panel are stored;

a compensation value determiner configured to select one of the plurality of lookup tables based on a current temperature of the display panel and colors of the pixels, and to calculate a grayscale compensation value corresponding to compensated deterioration index data and scaled grayscale level from the selected lookup table; and a compensation data calculator configured to apply the calculated grayscale compensation value to the scaled grayscale of the input image data to provide the compensated image data to the data driver.

8. The display device of claim 7, wherein the compensation value determiner is configured to divide the display panel into a plurality of blocks and to set block weights for the plurality of blocks, and wherein the compensation value determiner is further configured to apply the block weights to the deterioration index data, and to determine the grayscale compensation value based on the deterioration index data to which the block weights have been applied.

9. A display device comprising:

a display panel having a plurality of pixels arranged in a display area to display an image;

a scan driver configured to drive gate lines of the display area;

a data driver configured to drive data lines in the display area;

a timing controller configured to sort input image data to match a resolution of the display area and control driving timing of the scan driver and the data driver; and a deterioration compensator configured to analyze a deterioration index through the sorted input image data, and generate deterioration-compensated image data based on deterioration index data containing the deterioration index and an input grayscale level of the sorted input image data, to provide it to the data driver, wherein the deterioration compensator comprises:

a deterioration calculator configured to calculate a deterioration weight for the sorted input image data based on the sorted input image data and predetermined reference requirements and to calculate deterioration data containing the deterioration weight, wherein the deterioration compensator is configured to calculate deterioration weights and deterioration indices according to the deterioration weights based on the sorted input image data, to modulate the deterioration indices depending on a driving frequency of the display panel, and to generate the deterioration-compensated image data using the deterioration index data containing the compensated and modulated deterioration index and the deterioration data.

10. The display device of claim 9, wherein the deterioration compensator is configured to scale and modulate pixel-specific grayscale values of the sorted input image data based on a scaling ratio corresponding to a scale of the deterioration index data, and to calculates grayscale compensation values of the deterioration compensation data corresponding to the pixel-specific grayscale values of the scaled and modulated image data, and to compensate and modulate the sorted input image data with the grayscale compensation values.

11. The display device of claim 9, wherein the deterioration compensator comprises:

a scale converter configured to scale and modulate pixel-specific grayscale values of the sorted input image data based on a scaling ratio corresponding to a scale of the deterioration index data;

an accumulation amount calculator configured to sequentially accumulate the deterioration data at least every frame to generate the deterioration index data containing a count of the accumulated deterioration data;

a deterioration index compensator configured to correct the count of the deterioration index data depending on the driving frequency of the display panel; and a data compensator configured to calculate grayscale compensation values of the deterioration compensation data respectively corresponding to the pixel-specific grayscale values of the scaled and modulated image data, and to compensate and modulate the sorted input image data with the grayscale compensation values.

12. The display device of claim 11, wherein the deterioration index compensator is configured to vary or correct the count of the deterioration index data received in real time from the accumulation amount calculator depending on the driving frequency of the panel and an image display period (Active Time) or a blank period (Blank Time) for each frame.

13. The display device of claim 12, wherein the deterioration index compensator is configured to maintain the deterioration index of the deterioration index data calculated by the accumulation amount calculator depending on the driving frequency of the display panel, or to correct the deterioration index by increasing or lowering it to a value corresponding to the driving frequency.

14. The display device of claim 12, wherein the scale converter is configured to scale the pixel-specific grayscale values of the sorted input image data based on the scaling ratio corresponding to the deterioration index data to prevent a grayscale compensation value from being saturated due to accumulation of the deterioration data, and to generate scaled image data.

15. The display device of claim 11, wherein the data compensator comprises:

a data storage comprising a plurality of lookup tables in which deterioration indices of the deterioration index data compensated by the deterioration index compensator and the deterioration compensation values respectively corresponding to display grayscale levels displayable in the display panel are stored;

a compensation value determiner configured to select one of the plurality of lookup tables based on a current temperature of the display panel and colors of the pixels, and to calculate a grayscale compensation value corresponding to compensated deterioration index data and scaled grayscale level from the selected lookup table; and a compensation data calculator configured to apply the calculated grayscale compensation value to the scaled grayscale of the input image data to provide the compensated image data to the data driver.

16. The display device of claim 15, wherein the compensation value determiner is configured to divide the display panel into a plurality of blocks and to set block weights for the plurality of blocks, and wherein the compensation value determiner is further configured to apply the block weights to the deterioration index data, and to determine the grayscale compensation value based on the deterioration index data to which the block weights have been applied.

17. An electronic device including a display device, wherein the display device comprising:

a display panel having a plurality of pixels in a display area to display an image;

a scan driver configured to drive gate lines of the display area;

a data driver configured to drive data lines in the display area;

a timing controller configured to sort input image data to match a resolution of the display area and to control driving timing of the scan driver and the data driver; and a deterioration compensator configured to analyze a deterioration index through the sorted input image data, and to generate deterioration-compensated image data based on deterioration index data containing the deterioration index and an input grayscale level of the sorted input image data, to provide it to the data driver, wherein the deterioration compensator comprises:

a deterioration calculator configured to calculate a deterioration weight for the sorted input image data based on the sorted input image data and predetermined reference requirements and to calculate deterioration data containing the deterioration weight, wherein the deterioration compensator is configured to compensate and modulate deterioration indices of the deterioration index data depending on a driving frequency of the display panel, and to generate the deterioration-compensated image data using the deterioration index data containing the compensated and modulated deterioration index and the deterioration data.

* * * * *